(12) United States Patent
Paice

(10) Patent No.: US 7,719,858 B1
(45) Date of Patent: May 18, 2010

(54) FIFTEEN-PHASE AUTOTRANSFORMER

(76) Inventor: Derek Albert Paice, 114 Rosewood Ct., Palm Harbor, FL (US) 34685

(*) Notice: Subject to any disclaimer, the term of this patent is extended or adjusted under 35 U.S.C. 154(b) by 0 days.

(21) Appl. No.: 12/387,440

(22) Filed: May 4, 2009

(51) Int. Cl.
*H02M 7/48* (2007.01)

(52) U.S. Cl. .............................. 363/5; 363/64; 363/129

(58) Field of Classification Search ............... 363/5, 363/45, 64, 125, 129, 148, 152, 154; 323/261
See application file for complete search history.

(56) References Cited

U.S. PATENT DOCUMENTS

| | | | | |
|---|---|---|---|---|
| 5,148,357 A | * | 9/1992 | Paice | 363/5 |
| 6,198,647 B1 | * | 3/2001 | Zhou et al. | 363/154 |
| 6,249,443 B1 | * | 6/2001 | Zhou et al. | 363/5 |
| 6,335,872 B1 | * | 1/2002 | Zhou et al. | 363/154 |
| 6,995,993 B2 | * | 2/2006 | Sarlioglu et al. | 363/44 |
| 7,274,280 B1 | * | 9/2007 | Paice | 336/148 |
| 7,277,302 B2 | * | 10/2007 | Gazel et al. | 363/5 |

* cited by examiner

*Primary Examiner*—Adolf Berhane

(57) ABSTRACT

A polygon connected three-phase autotransformer using nine windings per phase provides a reduced power rating fifteen-phase power source suitable for 30-pulse AC to DC power converters. The windings are selected and connected in a manner that accommodates zero-sequence currents, such as the third harmonic, and minimizes total kVA rating. When the autotransformer is used to power a 15-phase AC to DC converter its kVA rating is typically less than 51% of the DC load kW. AC line current distortion is negligible and can satisfy the most exacting practical harmonic specifications. Additional isolated windings can provide means for the invention to operate as an efficient double-wound transformer.

7 Claims, 6 Drawing Sheets

| FRACTIONAL TURNS RELATIVE TO 1-N = 1.0 | PRACTICAL INTEGER TURNS |
|---|---|
| A1 = 0.099829 | 5 |
| A2 = 0.356822 | 18 |
| A3 = 0.282225 | 14 |
| A4 = 0.195295 | 10 |
| A5 = 0.415823 | 21 |
| A6 = 0.477521 | 24 |

FIG. 1  PRIOR ART ART PATENT 5,148,357

PRIOR ART    PATENT 6,198,647

| FRACTIONAL TURNS RELATIVE TO 1-N = 1.0 | PRACTICAL INTEGER TURNS |
|---|---|
| A1 = 0.099829 | 5 |
| A2 = 0.356822 | 18 |
| A3 = 0.282225 | 14 |
| A4 = 0.195295 | 10 |
| A5 = 0.415823 | 21 |
| A6 = 0.477521 | 24 |

FRACTIONAL TURNS
RELATIVE TO 1-N = 1.0
A1 = 0.099829
A2 = 0.356822
A3 = 0.282225
A4 = 0.195295
A5 = 0.415823

DELTA CONNECTION WITH ARBITRARY TURNS OR "HIDDEN DELTA" FORMED BY ZERO-SEQUENCE IMPEDANCE OF CORE TYPE TRANSFORMER

PRACTICAL
INTEGER TURNS
A1 = 5
A2 = 18
A3 = 14
A4 = 10
A5 = 21

15-PHASE BRIDGE RECTIFIER

$$I(\omega T) = IDC \frac{4}{n\pi} \sin \frac{n\pi}{15} \cos n\omega T$$

where n is any positive odd integer

CALCULATED CURRENT - IDEAL TURNS - LOW INDUCTANCE

CALCULATED CURRENT - PRACTICAL TURNS AND INDUCTANCE

FIFTEEN-PHASE AUTOTRANSFORMER

FIELD OF THE INVENTION

The invention relates to static AC to DC power converters such as can be used for AC or DC motor drive systems.

REFERENCES CITED

U.S. Patent Documents

| | | |
|---|---|---|
| 5,148,357 | August 1992 | Paice |
| 6,198,647 | March 2001 | Zhou, et. al. |
| 7,274,280 | September 2007 | Paice |

Other Publications

"Evaluation of Three-Phase to Nine-Phase Transformer . . . Including Novel Third Harmonic Calculations." J. E. Armes et. al., Proc. 2007 IEEE Applied Power Electronics Conference.

BACKGROUND OF THE INVENTION

To meet industry needs for electrical power converters which convert AC to DC without injecting large amounts of harmonic currents into the power system, numerous transformer and converter topologies are available. A 15-phase transformer supplying a 30-pulse bridge rectifier provides means to ensure that an almost pure sine wave of current is drawn from a three-phase power supply. It ensures compliance with the most exacting harmonic current specifications.

There are few, if any, descriptions of 30-pulse converters in the public domain. However, some of the unique design issues relating to autotransformers for multi-pulse converters are described in U.S. Pat. No. 7,274,280. With appropriate design no interphase reactors are required. Using unique winding interconnections on the associated phase shifting transformer, means are provided to cater for third harmonic currents in the transformer output leads, such currents being caused by the inherent load current demands of many converter circuits.

Some autotransformer designs accommodate third harmonic current by means of a separate delta winding. This winding adds to the autotransformer power rating.

In other autotransformer designs, it may be feasible to eliminate the delta winding by taking advantage of the zero-sequence impedance associated with a three-phase core form structure. This impedance functions as a "hidden delta", as described in the paper by J. E. Armes, et. al., but external fluxes caused by the "hidden delta" may be the source of unwanted eddy current losses in the structures surrounding the transformer. Also, the performance is affected by parameters normally outside the control of the transformer designer.

The invention described here ensures a predictable path for third harmonic and other zero-sequence currents by appropriate selection and routing of the autotransformer windings. It does not require a separate delta winding and uses nine windings per phase. The invention can be used as the secondary configuration of a double-wound transformer with any three-phase input winding topology.

A variation of the invention can be used as the secondary arrangement of a double-wound transformer that includes a delta circuit in the primary. The same variation is feasible as an autotransformer when the "hidden delta" effect is tolerable, or other non-isolated or isolated delta circuits are connected.

BRIEF SUMMARY OF THE INVENTION

A novel three-phase, polygon connected autotransformer using appropriate turns ratios and unique interconnections provides a nominally balanced fifteen-phase set of output voltages. The topology of the invention controls circulating zero-sequence currents such as the third harmonic.

The fifteen AC output voltages can be applied to the terminals of a 15-phase, 30-pulse bridge rectifier, it being noted that pulse number refers to the number of pulses that constitute the DC output. Thirty pulses provide a very smooth DC output voltage with negligible ripple voltage. Also, the associated AC line input current contains few harmonic currents. The current distortion is low enough to meet the most exacting practical specifications.

The autotransformer output voltages are smaller than the input voltages by about 9%. This amount is especially suitable for 480 V industrial power converter systems.

Rating of the autotransformer is typically less than 51% of the converter DC load power.

The invention requires nine coils on each phase of the autotransformer, and represents a useful practical addition to the available prior art.

If required, a wide range of output voltages can be obtained by feeding the three-phase input supply to tappings on one or more of the nine coils or interconnections thereof.

In conjunction with an extra isolated coil, the autotransformer topology can be used as the secondary coil configuration of a double-wound isolation transformer. Because the invention provides a well defined path to control third harmonic currents, the primary coil of such double-wound transformer can use any of the known transformer methods, such as wye, zig-zag, delta; extended delta, or polygon.

BRIEF DESCRIPTION OF THE DRAWINGS

Individual transformer windings are shown as blocks, coils, or simply black lines as may be most appropriate. The windings may be physically separate or in some cases obtained by tappings on a single winding. Winding labels relate to each phase of a three-phase transformer fed by an AC supply with voltage vectors separated by 120°. Windings aligned in the same direction are on the same phase and have the same polarity. Connection nodes or terminals are indicated by numbers or letters, as appropriate.

Figure 1:
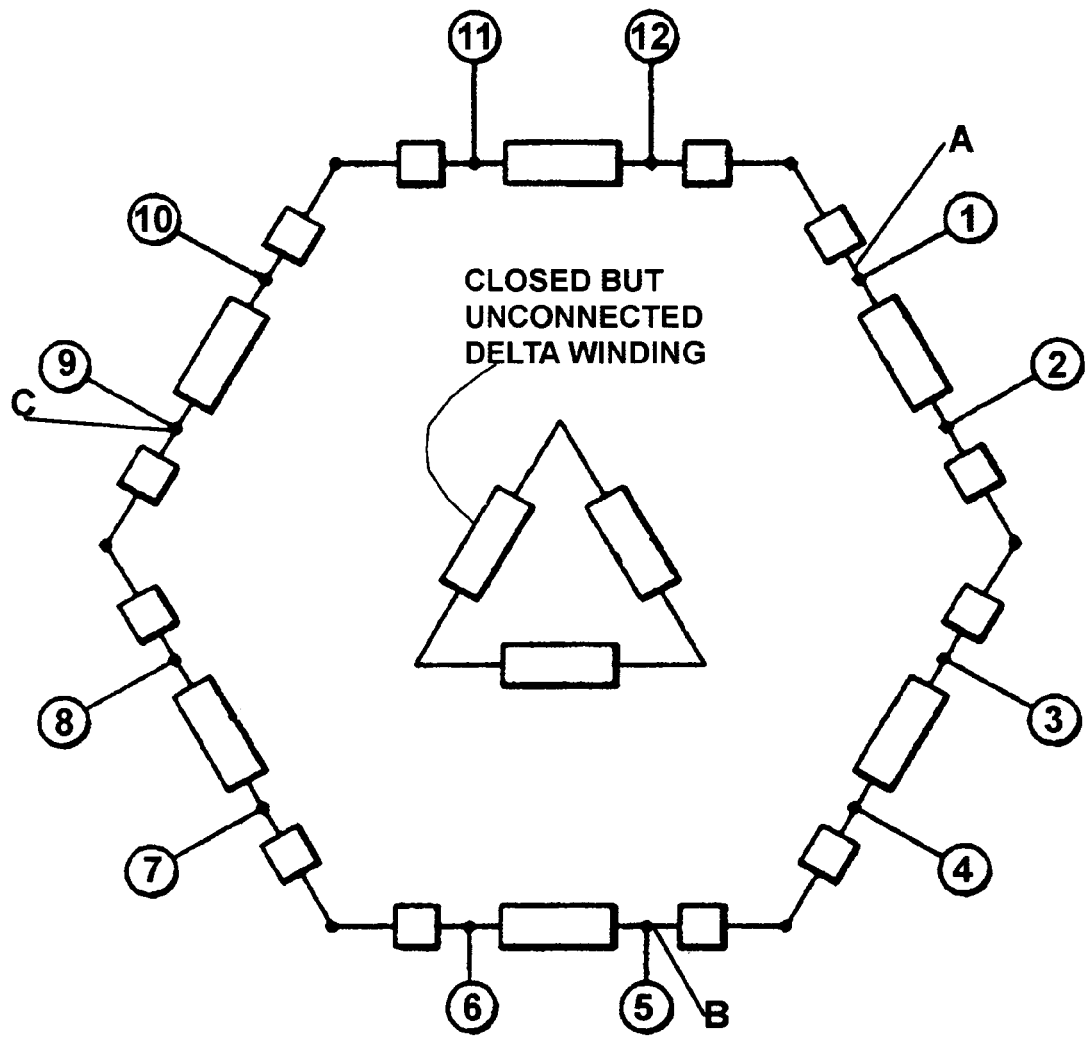
FIG. 1 shows the prior art of similar polygon autotransformer except that its output is only 12 phase. It is described in U.S. Pat. No. 5,148,357. This arrangement employs a separate delta winding to accommodate circulating third harmonic currents and requires seven windings on each phase of the transformer. The delta winding allows excellent operation but adds to the transformer power rating.
Figure 2:
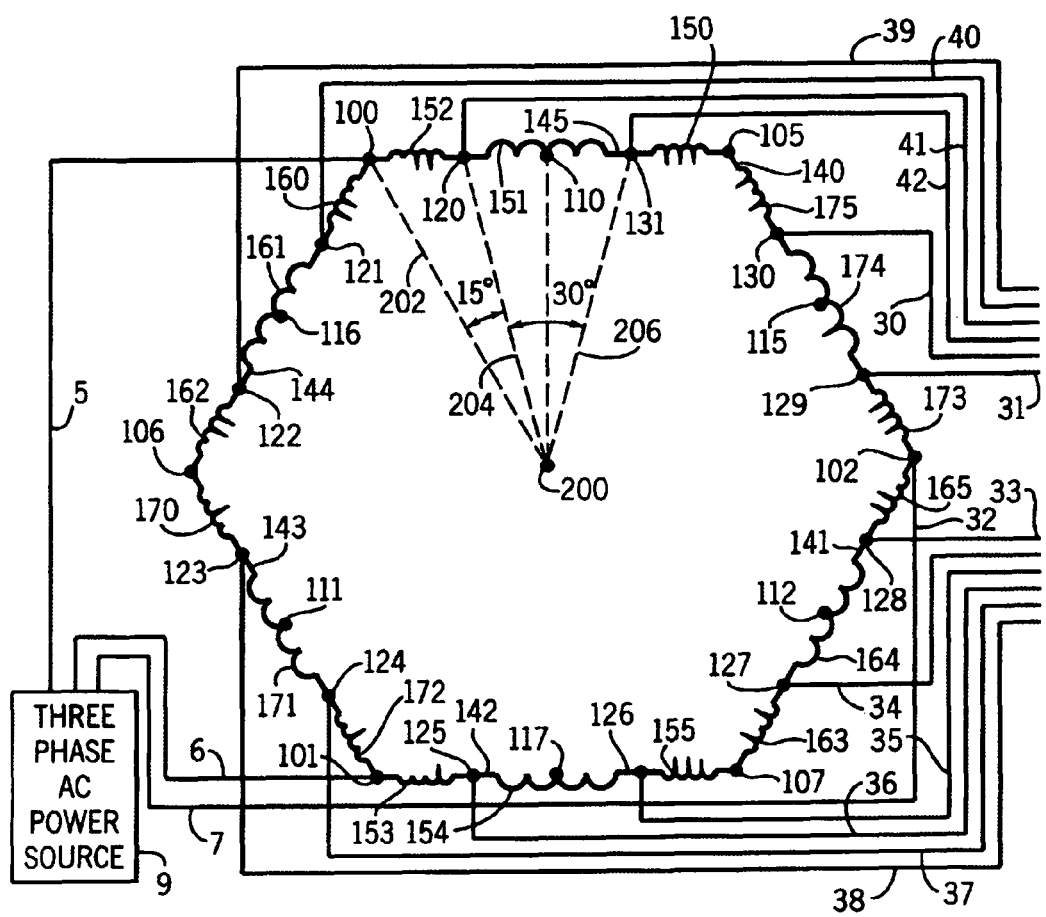
FIG. 2 shows one of the topologies given in the U.S. Pat. No. 6,198,647. This topology too is only for 12-phase operation. It is very similar to the U.S. Pat. No. 5,148,357 but does not provide a separate path to allow for the flow of zero-sequence currents caused by third harmonic currents in the AC output connections. Analysis of this topology shows that the third harmonic ampere-turns on each phase act in the same direction at the same instant, thus a third harmonic flux will be caused to exit the core and flow through the air and surrounding structures. The transformer acts as if it has a "hidden delta," but extraneous losses associated with the "hidden delta" are difficult to predict.

The transformer is assumed to have three phases referenced as A. B, and C. To help define voltage vectors a virtual neutral position, N, is given in the figure.

The input voltage is assumed to be a balanced three-phase source in which equal amplitude voltage vectors are separated by 120°. The input voltage can be applied to any three nodes separated by 120°. In the figure, nodes labeled X, Y, and Z are three such nodes and the dotted voltage vector $V_{X-N}$ represents a line-to-neutral voltage of the three-phase supply.

Windings with the same number of turns are labeled with the same number, for example, windings A1, B1, and C1 have the same number of turns, but on different phases A table at the foot of the drawing indicates ideal turns ratios, and also includes one set of possible practical integer turns that approach the ideal ratios.

Output voltage vectors are indicated by straight lines with arrow heads that point to the output nodes that are numbered 1 through 15. The output vectors emanate from the virtual neutral point, N. Output voltage vectors at nodes 1 and 2 are labeled $V_{1-N}$ and $V_{2-N}$ respectively. The angle between successive vectors is 24° as indicated for example between vectors $V_{1-N}$ and $V_{2-N}$.

Dashed lines drawn between nodes 1, 6, and 11 constitute a delta sketch that helps interpret the relevant phase positions. For example, the horizontal direction from node 6 to node 11 is considered to represent the A phase. From nodes 11 to 1, the dashed line represents the B phase, and from nodes 1 to 6 the C phase.

By appropriate selection of winding turns and interconnections, the need for a separate delta winding is avoided. This is the preferred embodiment of the invention and results in a transformer rated at less than 51% of the DC load. The essence of the invention lies in the manner in which windings A6, B6, C6 are sized and connected with windings B4, C4, and A4 respectively. It will be clear to those skilled in the art that windings such as A4 and C6 could be interconnected in the sequence C6 and A4 without altering the essence of the invention, but such change in sequence would provide alternative connection nodes and facilitate an alternate manufacturing procedure.

The third harmonic current flowing in individual windings of the autotransformer depends upon the vector relationship of currents and turns divided by the algebraic sum of the turns; thus the algebraic sum of the turns is very important. The algebraic sum of the turns is obtained by adding the turns with due regard for the polarity of voltages induced in them. For example, starting at node 15 and moving clockwise around the polygon, assume that moving from left to right is negative and right to left is positive then the algebraic sum of the idealized turns on phase A is:

(−A2−A2−A4+A4+A1+A3+A5+A6+A1), namely, 0.6616.

This result is significantly greater than zero, and ensures that zero-sequence currents can flow in a predictable, efficient manner. It obviates the need for a separate delta winding.

Using straightforward but lengthy vector algebra, it can be shown that the third harmonic current flowing from node 15 to node 1 through windings A2 and B1 is 2.12 times the third harmonic current flowing from each of the fifteen output nodes. This represents a reasonable amount of circulating current and does not significantly affect the transformer rating.

Figure 4:
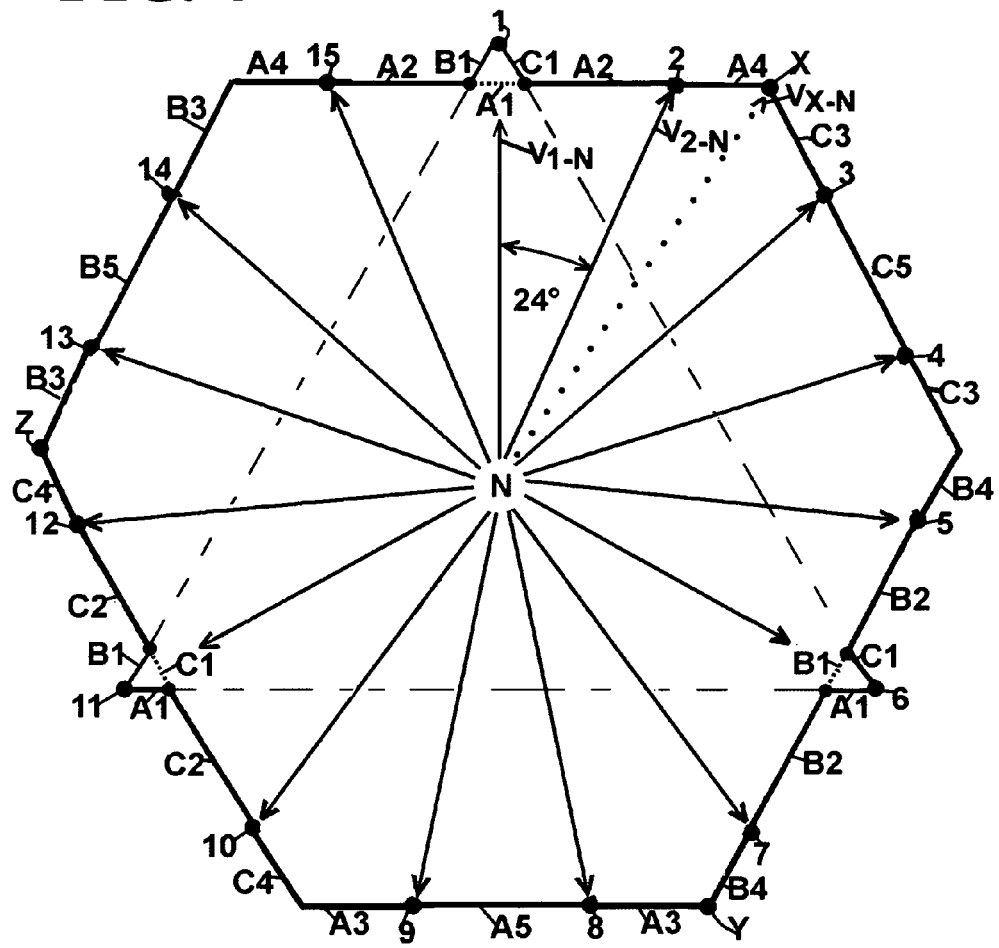

FIG. 4 shows a modification to the topology of the invention that may be useful where a three-phase core form structure with tolerable "hidden delta." effect is feasible, or where other isolated or non-isolated delta circuits are connected. For example, one or more delta circuits can be formed at nodes such as 1, 6, and 11 by adding an additional A1, B1 and C1 winding respectively All of these additional delta windings are shown dotted.

This variation of the invention, without any of the dotted windings, is also satisfactory for the secondary of a double-wound design in which the primary winding includes a delta path.

Figure 3:
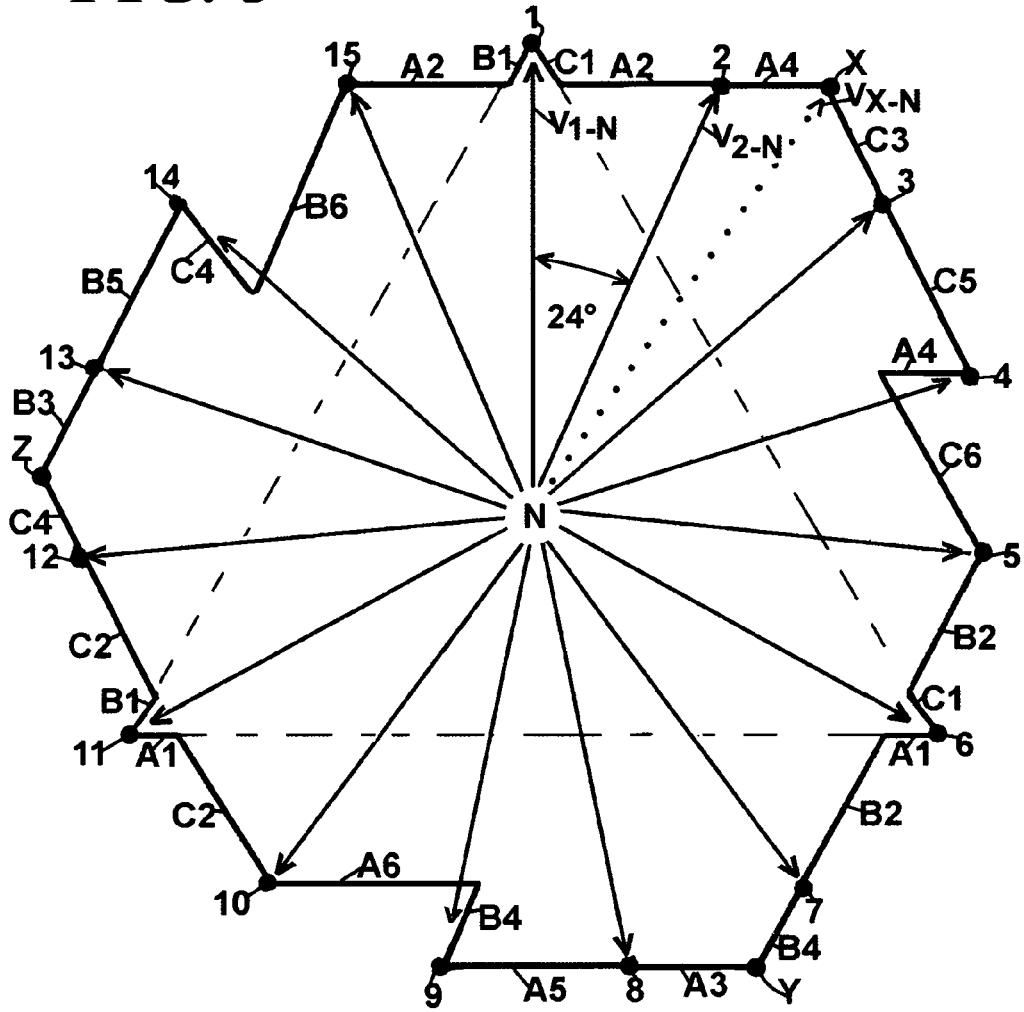
FIG. 3 shows the basic arrangement of the windings in the 15-phase autotransformer of the invention. Nine windings are required on each phase. The windings are defined by letters and numbers. The letters define the phase with which the winding is associated and the numbers are used to indicate the relative fractional size or actual turns on the winding.

As in FIG. 3 the windings are defined by letters and numbers. The letters define the phase with which the transformer is associated and the numbers are used to indicate the ideal relative fractional size or actual turns. The transformer is assumed to have three phases referenced as A. B, and C.

Windings with the same number of turns are labeled with the same number, for example, windings A1, B1, and C1 have the same number of turns.

A table at the foot of the drawing indicates ideal turns ratios, and includes possible practical integer turns that approach the ideal ratios.

To help define voltage vectors a virtual neutral position, N, is given in the figure. Output voltage vectors emanate from the virtual neutral point, N, and are indicated by straight lines with arrow heads that point to the output nodes which are numbered 1 through 15. The angle between successive vectors is 24° as indicated between vectors labeled $V_{1-N}$ and $V_{2-N}$.

Dashed lines drawn between nodes 1, 6, and 11 constitute a delta sketch that helps interpret the relevant phase positions. For example, the horizontal direction from 6 to 11 is considered to represent the A phase. The dashed line from nodes 11 to 1 represents the direction of the B phase, and nodes 1 to 6 the C phase.

When the fractional turns on each phase are added algebraically, that is with due regard for the polarity of voltages induced in them, the sum is relatively small—only 0.07571. Because of this, any circulating third harmonic current would be large unless the zero-sequence impedance of the transformer is fairly low, or additional delta circuits are provided.

For example, if the zero-sequence impedance of the transformer is neglected, a computer simulation shows that third harmonic current flowing from node 15 to node 1 through windings A2 and B1 is more than ten times the third harmonic load current in the transformer output. In practice, the need for integer turns results in non-ideal ratios and the third harmonic current in the transformer windings will be less than the idealized calculated values. However, this current will still be large, typically eight times the load current. It adversely affects the transformer performance and rating.

Figure 5:
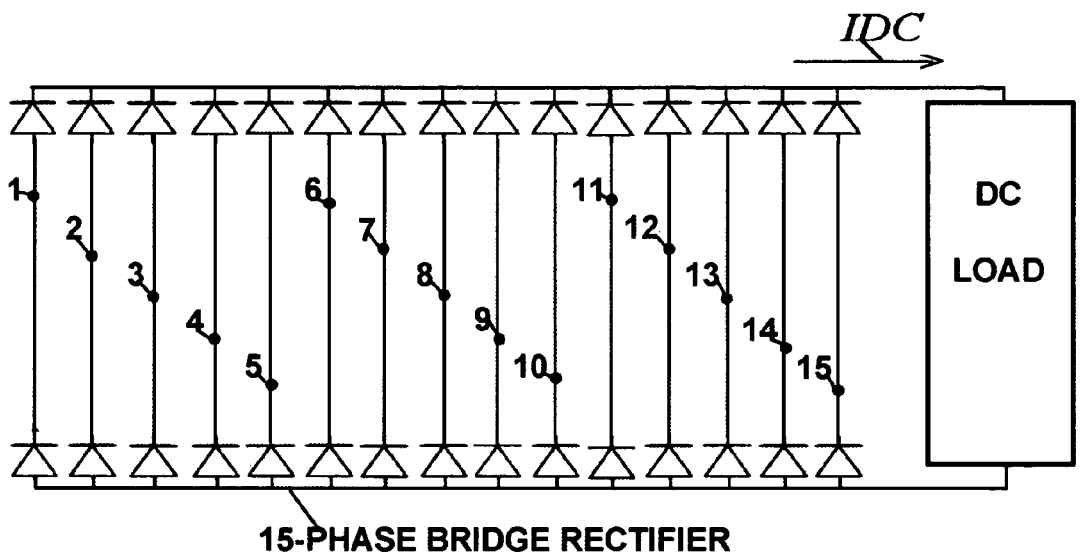

FIG. 5 shows the basic diode rectifier connections for a 15-phase, 30-pulse bridge converter. Nodes numbered 1 through 15 between pairs of diodes connect to the same numbered nodes on the autotransformer invention. A current, IDC, is shown flowing from the rectifier converter to a DC load.

The arrangement shown in FIG. 5 applies appropriately connected simple rectifying diodes. Similar results are obtained if the rectifying devices are controlled, such as would be the case with thyristors. The DC load can include inductive or capacitive filtering as required.

Figure 6:
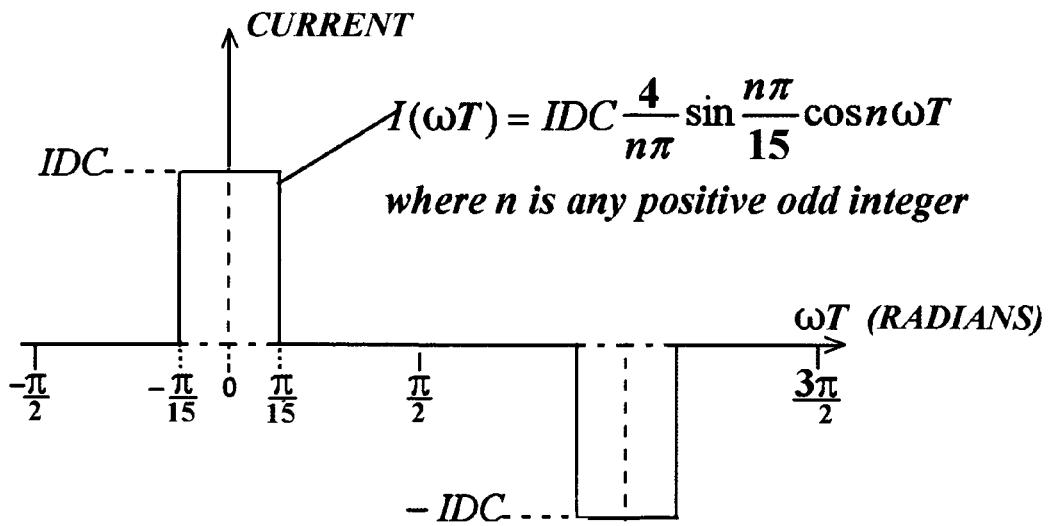

FIG. 6 shows graphically and mathematically the idealized current with a peak equal to the DC load current, IDC, that flows that flows into or out of each of the fifteen output terminals of the autotransformer invention. The same current flows from or to the fifteen-phase bridge rectifier.

The angular frequency, $\omega T$, is $2\pi f$ where f is the frequency of the AC supply. The variable n is any positive odd integer such as 1, 3, 5, 7, . . . .

Putting n=3 in the formula gives a value for the third harmonic. The result is a third harmonic current with an rms value that is about 17.6% that of the steady DC load current. It is this current or portion thereof that requires a low impedance path in which to flow in the transformer.

The total rms current in each AC output line from the transformer is 0.365 IDC.

Figure 7:
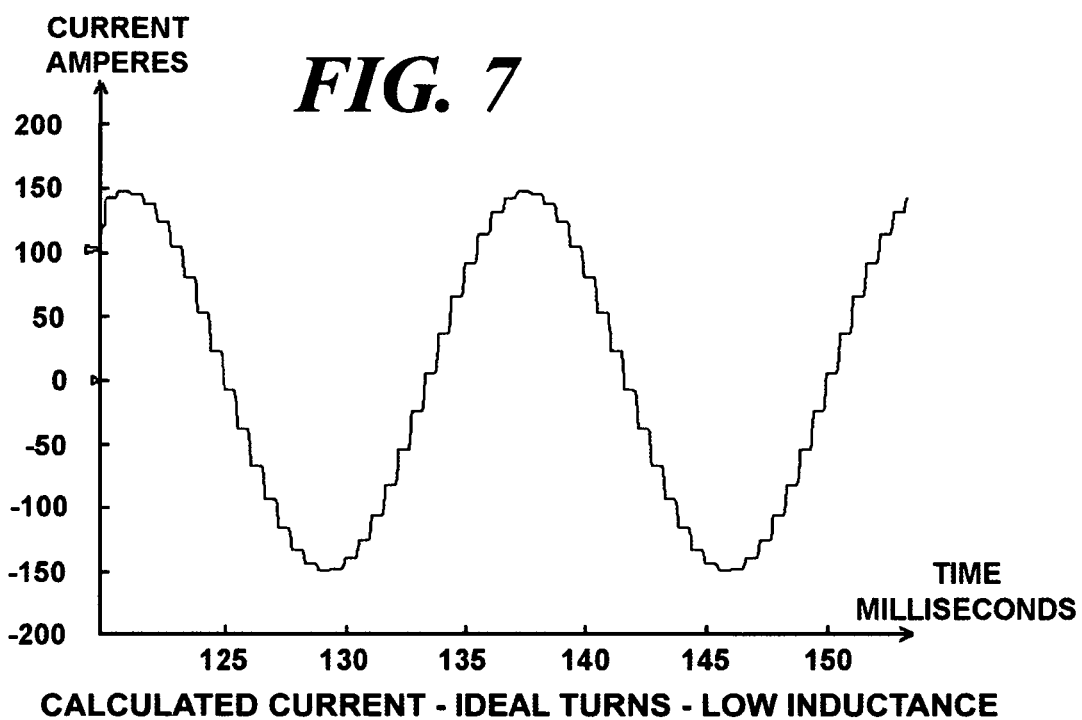

FIG. 7 shows a computer calculation of one of the AC line currents drawn by the invention feeding a 15-phase bridge rectifier and DC load when the turns ratios are ideal and there is little circuit inductance.

Figure 8:
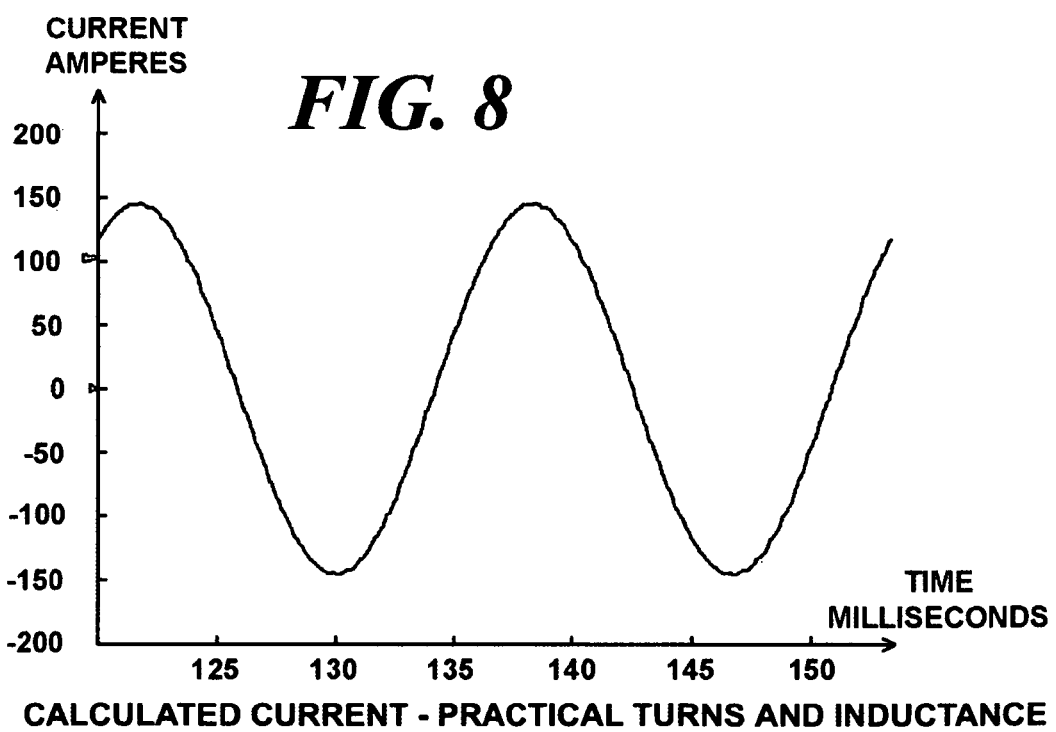

FIG. 8 shows a computer calculation of one of the AC line currents drawn by the invention feeding a 15-phase bridge rectifier and DC load when the turns ratio are practical integer values and there is a small amount of circuit inductance. The nearly sinusoidal waveform indicates a very low harmonic content.

DESCRIPTION OF THE INVENTION

For purposes of discussion it is here assumed that the three-phase autotransformer has three coils, one for each phase. Each coil may comprise a multiplicity of windings. The essence of the invention lies in the way in which windings from each phase are interconnected so as to provide the required phase shift and still provide a path to control the circulation of third harmonics of current.

During the analysis of various polygon topologies without extra delta windings, a rule for ensuring a well defined path for flow of third harmonic currents was developed. It is given here as as follows:

When traversing all the sides of the polygon in a clockwise or counter clockwise direction there must be a surplus of turns when the turns in each coil are summed with due regard for polarity, that is, algebraically. If this is not so then, in an ideal case when the summation is zero it can be shown that there is no finite solution for the third harmonic circulating current, and the transformer will likely not operate as expected. If the summation of turns is near zero there will be a defined solution for the amount of circulating current but it may be an unacceptably large value. In practice the third harmonic circulating current would likely be limited by second order parameters of the transformer, such as winding impedance, and the ability of flux to escape from the core, but such operation is not easily defined or guaranteed to be satisfactory.

Referring to the preferred embodiment of the invention in FIG. 3, a three-phase input voltage is connected to nodes X, Y, and Z. The voltage $V_{1-N}$ is assumed to be the reference vector at an angle of 0° and with an amplitude of unity. If the supply has a sequence rotation of X, Y, Z, the output voltage vector $V_{2-N}$ will lag 24° on the reference vector. In an ideal case, the angles between consecutive output vectors are all at 24°. The fifteen output connection points/nodes are numbered 1 through 15. The output from these nodes is fed to a 15-phase bridge converter.

Individual transformer windings are labeled as A1, B1, C1, etc. to indicate their size relative to the output which is assumed to have a magnitude of unity. The relative position of the windings is shown in FIG. 3. Windings with the same reference number have the same number of fractional turns. For example, windings A5, B5, and C5 have the same fractional turns but are located on phases A, B, and C respectively. Three dashed lines on FIG. 3 are constructed so as to help identify the phases of the autotransformer invention. For example, windings on phase A are parallel with the construction line drawn between nodes 6 and 11. Phase B windings are parallel to the construction line drawn between nodes 11 and 1, and so on.

Design Information:

To determine the relative turns of each winding we proceed using vectors, geometry, and arithmetic. Vectors are here shown in italics.

Refer to FIG. 3 then between nodes 1 and 2 we have the vector relationship:

$$1\angle 0° - C1\angle 30° + A2\angle -90° = 1\angle -24°$$

Solving this relationship we get:

$$C1=A1=B1=0.099829$$

$$\text{and } A2=B2=C2=0.356822$$

A similar method solves the remaining relationships. Results are given in the table in FIG. 3. A set of practical integer numbers that approximate the ideal ratios is also given. These practical numbers give excellent results and were used to give the simulation results shown in FIG. 7 and FIG. 8

A range of practical turns that give good results for the invention shown in FIG. 3, and its variation shown in FIG. 4, are given in Table 1.

TABLE 1

Practical Integer Turns for the 15-Phase Autotransformer Invention

| Winding reference | Integer turns | | | | | |
|---|---|---|---|---|---|---|
| A1 | 2 | 4 | 5 | 6 | 7 | 9 |
| A2 | 7 | 14 | 18 | 21 | 25 | 32 |
| A3 | 6 | 11 | 14 | 17 | 20 | 25 |
| A4 | 4 | 8 | 10 | 12 | 14 | 18 |
| A5 | 8 | 17 | 21 | 25 | 29 | 37 |
| A6 (not used in FIG. 4) | 10 | 19 | 24 | 29 | 33 | 43 |

Winding currents can be calculated by closed form methods, but the process is tedious. Results are obtained much more rapidly from a computer simulation. Transformer impedances should be included.

The extent to which third harmonic circulating currents contribute to the total rms current is affected by the topology, and is an important feature of many multi-phase autotransformers.

A third harmonic VA factor for multi-phase autotransformers is proposed in the paper by J. E. Armes, et. al. The third harmonic VA factor does not, of itself, establish the total transformer kVA rating but is an important design consideration. By minimizing it, efficient transformer designs can be obtained and potential performance problems avoided. The equation defining the third harmonic VA factor is given below.

Third harmonic VA factor=ΣFractional winding×third harmonic current through it.

Using this formula to compare the invention shown in FIG. 3 with the variation shown in FIG. 4, the third harmonic VA rating of both designs is similar. However, the addition of an extra delta winding as in FIG. 4 is a practical disadvantage. For this reason the FIG. 3 topology is the preferred embodiment. However, in a double-wound transformer design with delta connected primary, either circuit would be very effective.

If the topology of FIG. 4 is considered without an additional delta circuit, or its functional equivalent, the third harmonic VA factor is calculated to be more than seven times greater than that in FIG. 3.

The open circuit DC output voltage from a 15-phase bridge converter is obtained from consideration of the output voltage waveform. It is given by:

$V_{DO}$=2.8×the line-to-neutral voltage of the 15-phase supply.

Referring to FIG. 3 and applying the vector algebra it is determined that the line-to-neutral output voltage, V relative to the line-to-neutral supply voltage $V_{X-N}$ is given by:

$V_{1-N}$=0.914×$V_{X-N}$

Example:

Consider a 15-pulse AC to DC converter fed from the invention shown in FIG. 3 and connected to a 470 V three-phase power source, then:

$V_{DO}$=470/(√3)×0.914×2.8, namely, 694.5 V

The transformer volts per turn, $k_{VT}$, is an important design parameter. It is determined as follows:

Let the line-to-line supply voltage be $V_{L-L}$, and assume this voltage is applied between nodes X and Y in FIG. 3. Then, using vector algebra we have:

$V_{L-L}$=$k_{VT}$[(C1+C3+C5+C6)∠30°+(A1+A4)∠−90°−(2B2+B4)∠150°]

Substituting the integer turns given as an example in FIG. 3 we get:

$V_{L-L}$=$k_{VT}$(64∠30°+15∠−90°−46∠150°)=$k_{VT}$(95.4516∠−3.6)

Using only the numerical value we obtain: $k_{VT}$=$V_{L-L}$/95.4516

With an input of 470 V, $k_{VT}$=470/95.4516, namely, 4.924 volts/turn.

If the DC load is 70 kW, the autotransformer invention will be rated at about 36 kVA.

Computer calculated results for a nominal 70 kW output are given in FIG. 7 and FIG. 8. Excellent results are obtained using practical turns ratios and transformer leakage inductance.

In practical designs it is desirable to ensure relatively low, balanced transformer impedances.

What I claim is:

1. An autotransformer for converting three-phase AC power to fifteen-phase AC power comprising:
    a. three coils each containing serial windings and non-serial windings;
    b. said serial windings and non-serial windings totaling at least nine in number;
    c. said serial windings and non-serial windings being magnetically coupled;
    d. said serial windings and non-serial windings on said three coils being interconnected to form a multi-sided polygon;
    e. said multiple-sided polygon having multiple nodes to which connections can be made;
    f. said multiple nodes including symmetrically disposed nodes;
    g. said symmetrically disposed nodes providing points for applying three-phase AC input voltage and extracting AC output voltages of predetermined amplitude and phase;
    h. wherein predetermined AC output voltages may be less than greater than or equal to that of the three-phase AC input voltage.

2. The autotransformer of claim 1 wherein the input voltage is a three-phase AC supply and the output is a fifteen-phase AC supply with voltages nominally equal in amplitude and typically spaced by 24°.

3. The autotransformer of claim 1 with an additional isolated winding on each coil to provide a closed delta circuit.

4. The autotransformer of claim 1 with one or more additional non-isolated windings to provide one or more closed delta circuits.

5. The autotransformer of claim 1 with an additional isolated winding on each coil such that three phase AC input power may be applied through such isolated windings to convert the autotransformer to a double-wound transformer.

6. The autotransformer of claim 2 wherein a fifteen-phase output is connected to a 15-phase rectifying device so as to produce a 30-pulse converter with low output voltage ripple on the DC voltage and with low harmonic distortion of the AC input harmonic current.

7. The autotransformer of claim 2 wherein series reactance is included in the three phase AC input power source as to further attenuate high frequency harmonic currents that may be associated with a multi-pulse AC to DC converter.

* * * * *